United States Patent [19]
Woods

[11] Patent Number: 5,978,169
[45] Date of Patent: Nov. 2, 1999

[54] REPEATED SERVO RUNOUT ERROR COMPENSATION IN A DISC DRIVE

[75] Inventor: Philip Ray Woods, Oklahoma City, Okla.

[73] Assignee: Seagate Technology, Inc., Scotts Valley, Calif.

[21] Appl. No.: 08/986,112

[22] Filed: Dec. 5, 1997

Related U.S. Application Data

[60] Provisional application No. 60/059,822, Sep. 23, 1997.

[51] Int. Cl.$^6$ ................................................ G11B 5/596
[52] U.S. Cl. .................................... 360/77.04; 360/77.08
[58] Field of Search ............................ 360/77.04, 78.09, 360/77.08, 78.04, 48

[56] References Cited

U.S. PATENT DOCUMENTS

| | | |
|---|---|---|
| 4,136,365 | 1/1979 | Chick et al. . |
| 4,536,809 | 8/1985 | Sidman . |
| 4,594,622 | 6/1986 | Wallis .................................. 360/77.04 |
| 4,635,141 | 1/1987 | Coulter . |
| 4,679,103 | 7/1987 | Workman . |
| 4,691,152 | 9/1987 | Ell et al. ........................... 360/78.06 X |
| 5,136,439 | 8/1992 | Weispfenning et al. . |
| 5,262,907 | 11/1993 | Duffy et al. . |
| 5,402,280 | 3/1995 | Supino . |
| 5,404,253 | 4/1995 | Painter .................................. 360/77.04 |
| 5,793,559 | 8/1998 | Shepherd et al. ..................... 360/78.09 |

*Primary Examiner*—W. R. Young
*Assistant Examiner*—James L Habermehl
*Attorney, Agent, or Firm*—Crowe & Dunlevy

[57] ABSTRACT

An apparatus and associated method are disclosed for compensating for repeated servo runout error in a disc drive. The disc drive includes a disc on which servo information is arranged as a plurality of servo fields which define tracks on the disc. An actuator assembly is provided adjacent the disc and includes a head which accesses the servo fields and an actuator motor which moves the head relative to the disc. A servo circuit controls radial location of the head by applying current to the actuator motor in response to the servo information. The repeated servo runout error, caused by errors in the radial location of the servo fields on the disc, is compensated by the servo circuit through the use of compensation values which are stored in compensation fields of the servo fields. The compensation values are determined by measuring current applied to the actuator motor as the head follows a selected track, twice integrating the sequence of current measurement samples to determine a second integral of current, and using the second integral of current to determine the compensation values.

13 Claims, 6 Drawing Sheets

REPEATED SERVO RUNOUT ERROR COMPENSATION IN A DISC DRIVE

RELATED APPLICATIONS

This application claims the benefit of U.S. Provisional Application No. 60/059,822 entitled SYNCHRONOUS REPEATABLE RUNOUT IDENTIFICATION, filed Sep. 23, 1997.

FIELD OF THE INVENTION

The present invention relates generally to the field of disc drive devices and more particularly, but without limitation, to the compensation of repeated runout errors in the location of servo information on a disc of a disc drive, the servo information used for positional control of a disc drive read/write head.

Background

Disc drives enable users of modern computer systems to store and retrieve vast amounts of data in a fast and efficient manner. A typical disc drive houses a number of circular, magnetic discs (such as five to ten) which are axially aligned and rotated by a spindle motor at a constant, high speed (such as 10,000 revolutions per minute). As the discs are rotated, an actuator assembly moves an array of read/write heads out over the surfaces of the discs to store and retrieve the data from tracks defined on the surfaces of the discs.

A closed loop digital servo system is typically used to control the position of the heads relative to the tracks. The servo system generates a position error signal (PES) indicative of the position of the heads from servo information that is written to the discs during the manufacturing of the disc drive. In response to the detected position, the servo system outputs current to an actuator motor (such as a voice coil motor, or VCM) utilized to pivot the actuator assembly, and hence the heads, across the disc surfaces.

It is a continuing trend in the disc drive industry to provide successive generations of disc drive products with ever increasing data storage capacities and data transfer rates. Because the amount of disc surface area available for the recording of data remains substantially constant (or even decreases as disc drive form factors become smaller), substantial advancements in areal recording densities, both in terms of the number of bits that can be recorded on each track as well as the number of tracks on each disc, are continually being made in order to facilitate such increases in data capacity.

The servo information used to define the tracks is written during disc drive manufacturing using a highly precise servo track writer. While the tracks are intended to be concentric, uncontrolled factors such as bearing tolerances, spindle resonances, misalignments of the discs and the like tend to introduce errors in the location of the servo information. Each track is thus typically not perfectly concentric, but rather exhibits certain random, repeatable variations which are sometimes referred to as repeatable runout, or RRO, with the RRO appearing as a error component of the PES.

While RRO has previously had a minimal impact upon the operation of the servo system, RRO has an increasingly adverse affect as higher track densities are achieved. Particularly, RRO can ultimately lead to an upper limit on achievable track densities, as RRO cuts into the available track misalignment budget and reduces the range over which the servo system can provide stable servo control.

Methodologies to eliminate primary sinusoidal RRO components have been disclosed, such as by U.S. Pat. No. 5,402,280 issued Mar. 28, 1995 to Supino and U.S. Pat. No. 5,404,253 issued Apr. 4, 1995 to Painter. These and other methodologies typically comprise the use of a sine table to generate a sinusoidal correction signal of a selected amplitude and frequency which is added to the PES in order to eliminate the primary sinusoidal RRO components therefrom.

However, these and other prior art approaches are insufficient to compensate for largely random, non-sinusoidal (or complex sinusoidal) RRO within the PES. There is a need, therefore, for an improved approach to compensating for random variations in the location of servo information on the discs of a disc drive.

SUMMARY OF THE INVENTION

The present invention is directed to an apparatus and method for compensating for repeated servo runout error in a disc drive.

In accordance with a preferred embodiment, the disc drive includes a disc on which servo information is arranged as a plurality of servo fields which define tracks on the disc. An actuator assembly is provided adjacent the disc and includes a head which accesses the servo fields and an actuator motor (voice coil motor, or VCM) which moves the head relative to the disc.

A servo circuit controls radial location of the head by applying current to the actuator motor in response to the servo information. The repeated servo runout error, caused by errors in the radial location of the servo fields on the disc, is compensated by the servo circuit through the use of compensation values which are stored in compensation fields of the servo fields.

The compensation values are determined by measuring current applied to the actuator motor as the head follows a selected track, twice integrating the sequence of current measurement samples to determine a second integral of current, and using the second integral of current to determine the compensation values.

These and various other features as well as advantages which characterize the present invention will be apparent from a reading of the following detailed description and a review of the associated drawings.

BRIEF DESCRIPTION OF THE DRAWINGS

FIG. 8 provides a control diagram illustrating the manner in which the compensation values are used to compensate for the effects of the errors associated with the radial locations of the servo fields, the diagram of FIG. 8 representative of the operation of the digital signal processor of the servo circuit.

DETAILED DESCRIPTION

In order to facilitate the present discussion, the general construction and operation of a disc drive in which the present invention can be advantageously practiced will first be briefly discussed. Referring now to the drawings, and to FIG. 1 in particular, shown therein is a top plan view of a disc drive which is generally designated at 100.

Figure 1:
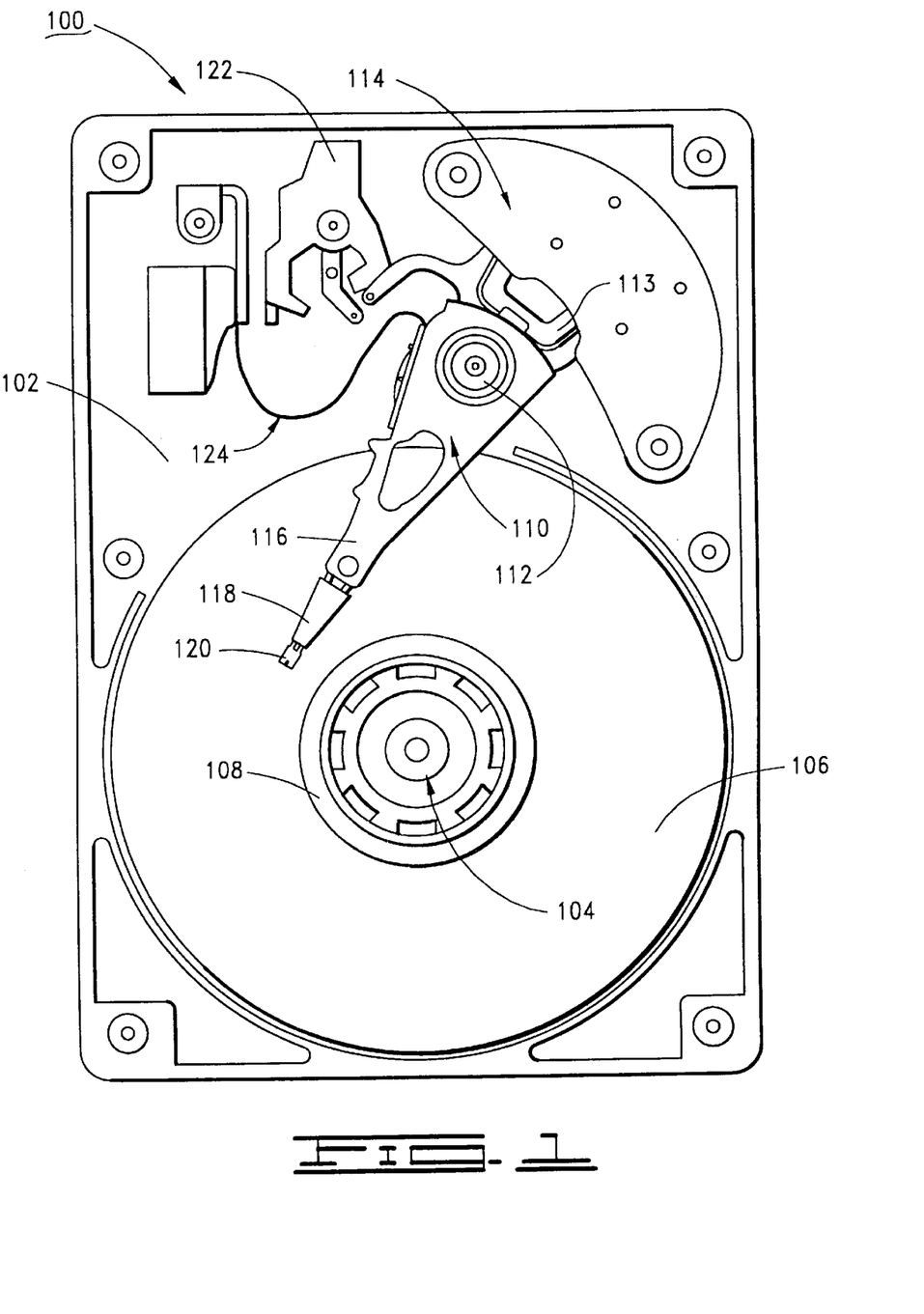
FIG. 1 provides a top plan view of a disc drive in which the present invention can be advantageously practiced.

The disc drive 100 includes a base casting 102 which forms a housing for the disc drive 100. The base casting 102 includes a substantially planar deck to which various disc drive components are mounted and normally extending side walls to which a top cover (not shown) is attached in order to provide an internal, sealed environment for the disc drive.

A spindle motor 104 is mounted to the base casting 102 and rotates a stack of discs 106 at a constant high speed during operation of the disc drive 100. A disc clamp 108 is provided to clamp the discs 106 to the spindle motor 104.

A rotary actuator assembly 110 is mounted to the base casting 102 for rotation about a cartridge bearing assembly 112 in response to currents applied to a coil 113 of a voice coil motor (VCM) 114. The actuator assembly includes a plurality of rigid arms 116 which extend into the stack of discs 106 as shown, with each of the rigid arms 116 having an associated flexible suspension assembly 118 extending therefrom.

Heads 120 are affixed to each of the suspension assemblies 118. The heads 120 include read and write elements which magnetically interact with the disc recording surfaces and slider assemblies which support the heads 120 upon air bearings established by wind currents set up by the high speed rotation of the discs 106.

FIG. 1 additionally shows a latch assembly 122 which secures the actuator assembly 110 when the disc drive 100 is deactivated, and a flex circuit assembly 124 which enables the heads 120 and the coil 113 to electrically communicate with disc drive control circuitry (not shown) on a printed circuit board mounted to the underside of the disc drive 100.

Figure 2:
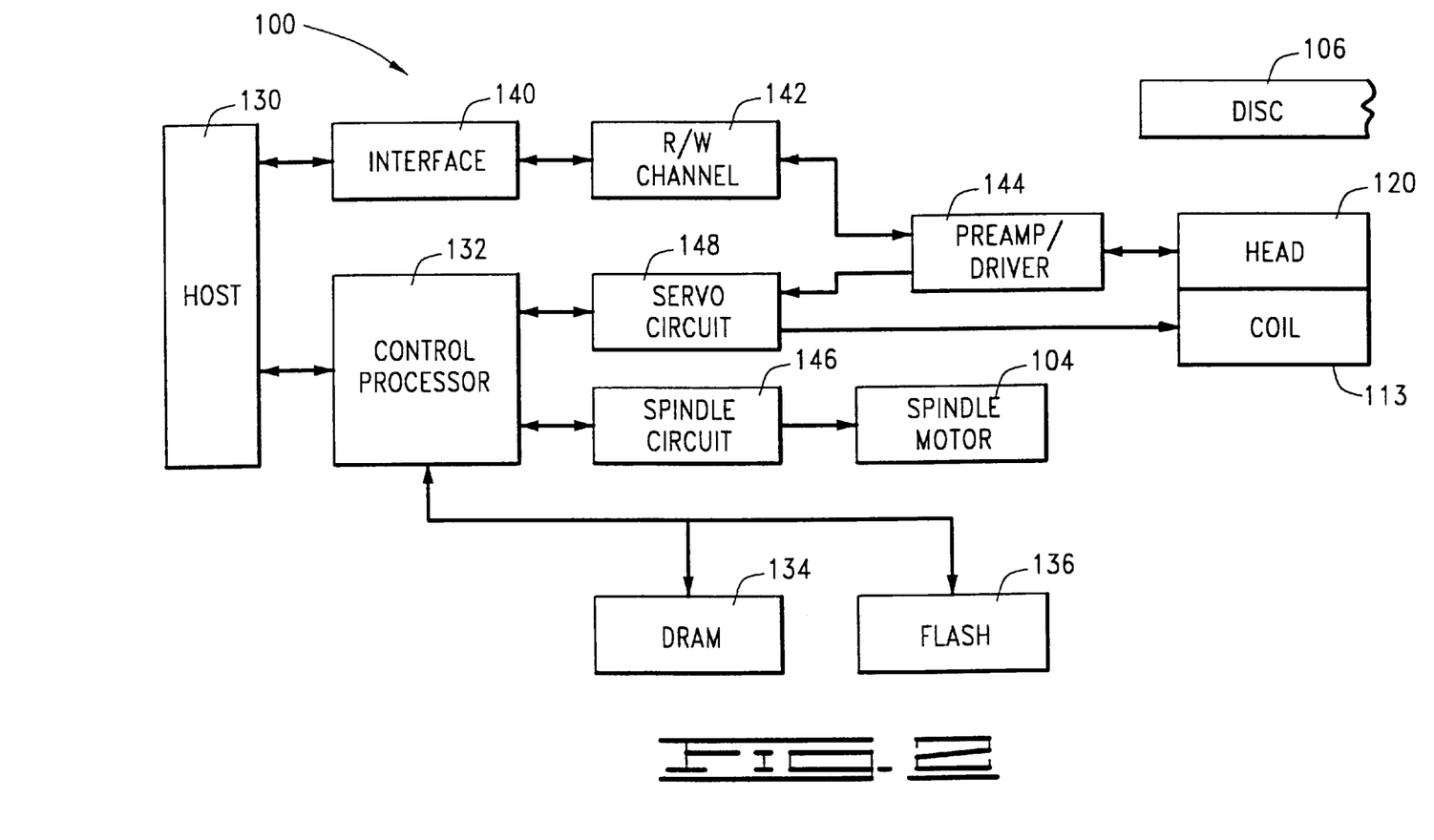
FIG. 2 is a functional block diagram of the disc drive of FIG. 1.

A functional block diagram of the disc drive control circuitry is provided in FIG. 2. A host computer 130, in which the disc drive 100 is mounted, provides top level control of a disc drive control processor 132, which in turn controls the operation of the disc drive 100 in accordance with programming and information stored in dynamic random access memory (DRAM) 134 and non-volatile flash memory 136.

Data to be stored by the disc drive 100 are transferred from the host computer 130 to an interface circuit 140, which includes a data buffer for temporarily buffering the data and a sequencer for directing the operation of a read/write channel 142 and a preamp/driver circuit 144 during data transfer operations. A spindle circuit 146 is provided to control the rotation of the discs 106.

A servo circuit 148 is provided to control the position of the heads 120 relative to the discs 106 as part of a servo loop established by the head 120, the preamp driver 144, the servo circuit 148 and the coil 113. The servo circuit 148 includes a digital signal processor (DSP) which is programmed to carry out two main types of servo operation: seeking and track following.

During a typical seek, a selected head 120 is moved from an initial track to a destination track on the corresponding disc 106. A velocity profile is formulated indicative of a target velocity trajectory for the head 120, with current being applied to the coil 113 to first accelerate and then decelerate the head 120 toward the destination track in accordance with the velocity profile. To maintain the trajectory of the head 120, the current is successively adjusted in relation to the difference between the actual velocity and the target velocity of the head 120.

During a track following mode of operation, the head 120 is caused to follow a corresponding selected track on the disc 106. The servo information from the track being followed is periodically sampled and provided to the servo circuit 148, which controls the amount of current applied to the coil 113 in order to maintain the head 120 in a desired relationship to the track. For reference, the construction and operation of a typical servo circuit are discussed in U.S. Pat. No. 5,262,907 issued Nov. 16, 1993 to Duffy et al., assigned to the assignee of the present invention.

Figure 3:
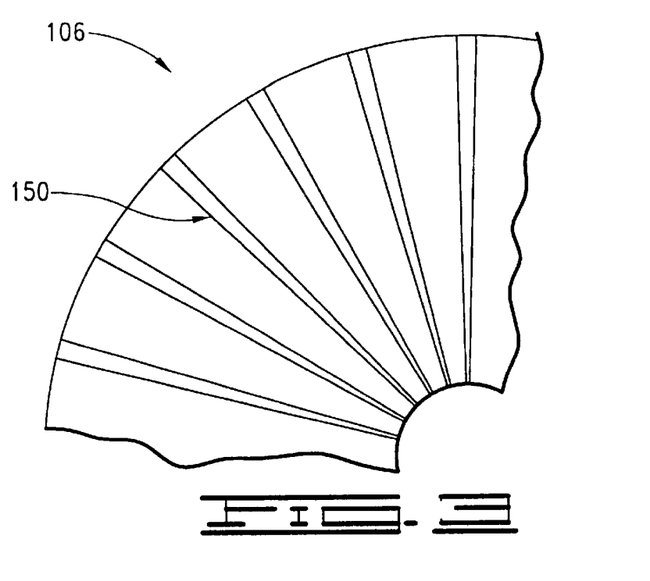
FIG. 3 provides a representation of a plurality of servo wedges on a portion of a disc of the disc drive, illustrating the manner in which servo information is stored on the disc.

The servo information is written to each of the recording surfaces of the discs 106 in a manner as set forth by FIG. 3. More particularly, FIG. 3 shows a portion of one of the discs 106 having a plurality of radially extending servo wedges, one of which is denoted at 150. For reference, each of the discs 106 is contemplated as having a total of 76 servo wedges on each recording surface.

Figure 4:
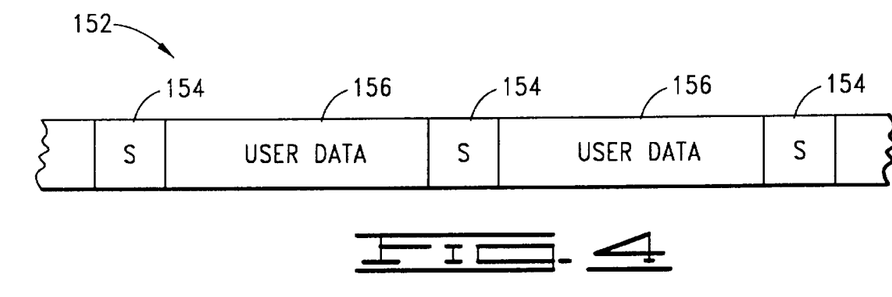
FIG. 4 illustrates a portion of one of the tracks on the disc, showing servo fields which define the track and user data portions in which user data are stored.

Each of the servo wedges is made up of a plurality of adjacently disposed servo fields which define the tracks on the disc 106. A portion of a selected track 152 is generally shown in FIG. 4, the track 152 having servo fields (denoted at 154) interspersed with user data portions 156 in which the user data are stored in a conventional manner.

Having concluded a discussion of the general construction and operation of the disc drive 100, a preferred embodiment of the present invention will now be discussed. Generally, the present invention is directed to compensating for variation in the locations of the servo fields 152 on the surfaces of the discs 106. Although FIG. 4 illustrates the servo fields 154 and user data portions 156 to be radially aligned so as to define the track 152 as a perfect circle on the disc 106, in reality it will be recognized that errors during the servo track writing process will result in tracks that are not perfectly concentric, but rather exhibit random, repeatable variation (also referred to as "repeatable runout", or "RRO").

Figure 5:
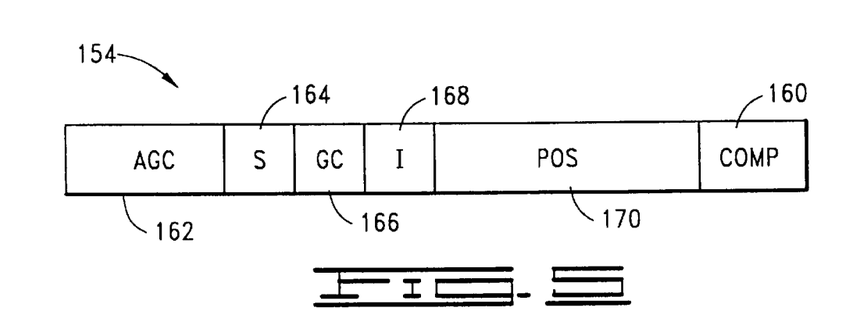
FIG. 5 illustrates one of the servo fields of FIG. 4, including a compensation (COMP) field for the storage of a compensation value used to minimize errors associated with the radial location of the servo field.

As shown in FIG. 5, and in a manner to be discussed below, each of the servo fields 152 is provided with a compensation (COMP) field 160 to which a compensation value is written, the compensation value enabling the servo circuit 148 to compensate for the error in the location of the servo field 152. For reference, FIG. 5 shows each servo field 152 to further include a number of conventional fields including an automatic gain control (AGC) field 162, a synchronization (S) field 164, a Gray code (GC) field 166, an index (I) field 168 and a quadrature position (POS) field 170, which are discussed, for example, in the previously mentioned Duffy U.S. Pat. No. 5,262,907 reference. However, it will be recognized that other servo field configurations can readily be used in conjunction with the present invention.

Figure 6:
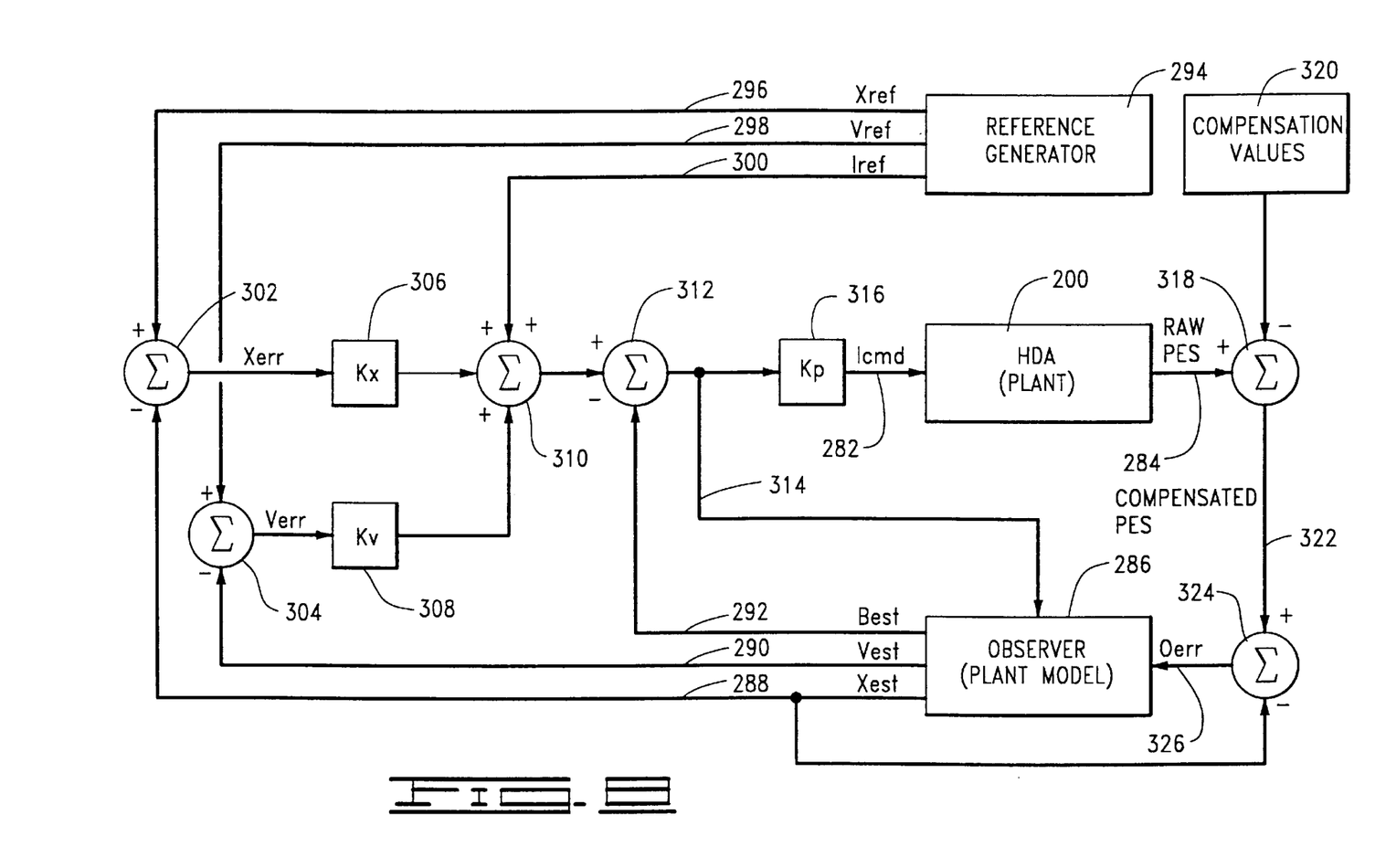
FIG. 6 provides a conceptual representation of the operation of a servo circuit of the disc drive.

To facilitate an understanding of the present invention, FIG. 6 has been provided as a conceptual representation of the servo loop during a track following mode of operation.

As shown in FIG. 6, a head/disc assembly (also referred to herein as the "plant") 200, which includes the actuator assembly 110 and the discs 106, outputs a head position signal on path 202 indicative of a true position of a selected head 120 with respect to true disc radius. The head position, in turn, is controlled by the application of a current signal on path 204 to the plant 200.

The head position signal is provided as an input to a summing junction 206, which also receives an RRO signal indicative of the RRO associated with the followed track on path 208. The summing junction 206 sums the head position signal with the RRO signal to obtain a raw PES signal, which is output on path 210.

To remove the RRO component of the raw PES signal, a compensation table 212 provides the necessary compensation values on path 214 to a summing junction 216, which sums the raw PES signal with the compensation values to obtain a compensated PES signal on path 218. The compensated PES signal 218 reflects true head position with respect to disc radius. A controller block 220 operates to generate the current signal on path 204 in response to the compensated PES signal 218.

Figure 7:
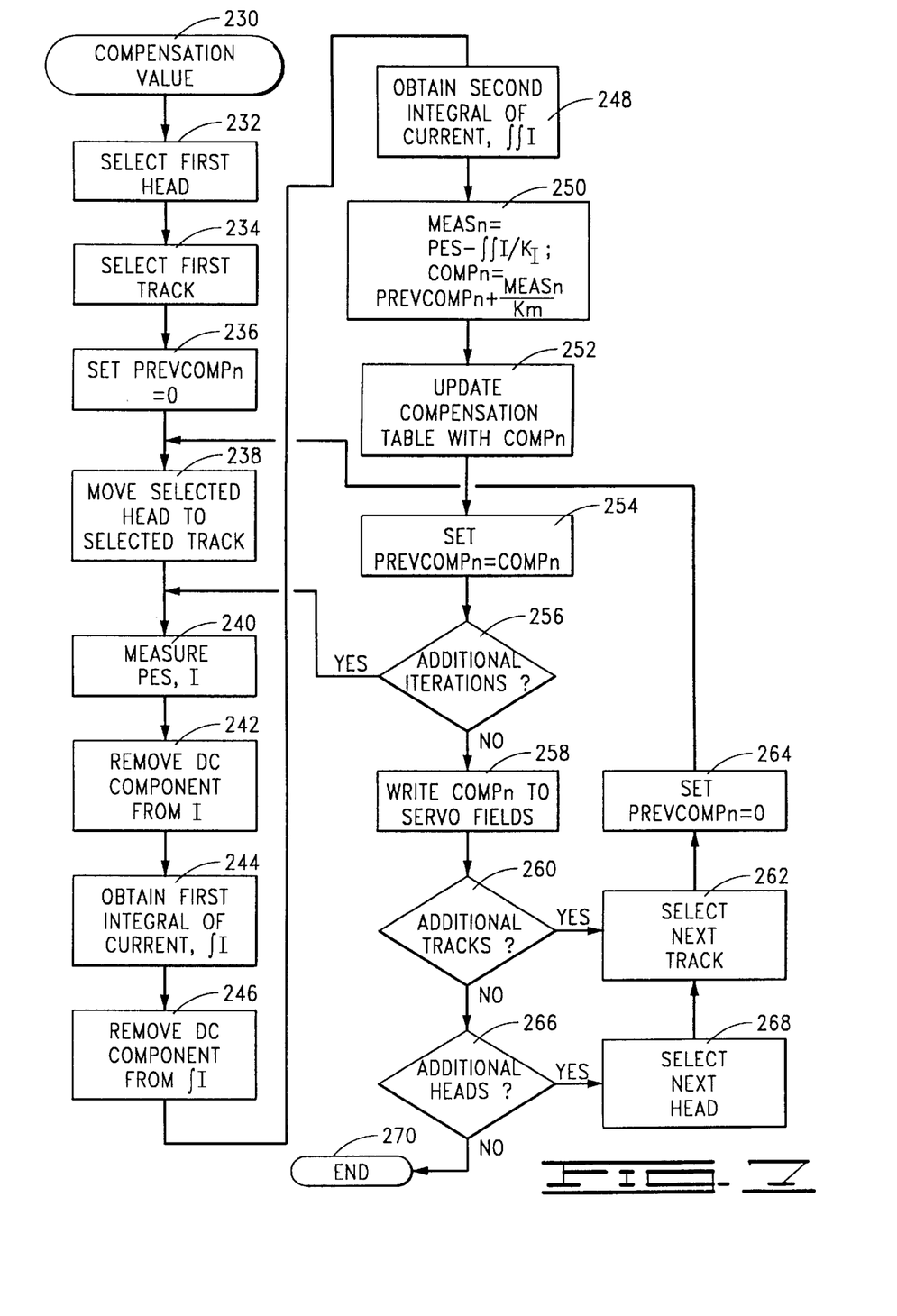
FIG. 7 provides a COMPENSATION VALUE routine which illustrates the steps performed by the disc drive to obtain the compensation values stored in the compensation fields of the servo fields of the disc drive, the routine representative of programming utilized by a digital signal processor of the servo circuit.

It will be recognized from a review of the diagram of FIG. 6 that, at least conceptually, the compensation values of the compensation table 212 used to remove the RRO from the raw PES could be readily obtained if the true head position with respect to disc radius (i.e., the values of the head position signal on path 202) were known. However, as will be recognized, a true head position signal such as represented in FIG. 6 is not typically available from the plant 200; rather, the plant 200 outputs a raw PES signal such as indicated on path 210 and includes both true head position information as well as an RRO component. FIG. 6 is useful, nevertheless, as the following relationships follow therefrom:

$$\text{raw PES} = \text{head position} + \text{RRO} \tag{1}$$

$$\text{RRO} = \text{PES} - \text{head position} \tag{2}$$

$$\text{RRO} = \text{PES} - \iint \text{current} \tag{3}$$

so that the RRO component of the PES, at any given sample, can be considered to be the difference between the actual PES and the second integral of the current. This follows because the current applied to the coil 113 is proportional to the acceleration of the head 120, so that the integral of the current provides an indication of head velocity, and the integral of the velocity provides an indication of head position. It is from this relationship that the compensation values for the compensation fields 160 are determined, as set forth by FIG. 7.

Referring to FIG. 7, shown therein is a COMPENSATION VALUE routine 230 indicative of the steps performed by the servo circuit 148 in determining compensation values for the purpose of removing the RRO associated with each track. The routine is preferably realized in programming utilized by the DSP of the servo circuit 148 and performed during the manufacturing of the disc drive 100.

As shown at block 232 in FIG. 7, the first head 120 for which compensation values are to be obtained is selected, after which the first track (such as 152) on the disc surface associated with the first head 120 is selected, by block 234. Preferably, the routine begins at the outermost track on each disc surface and works inwardly. A variable $\text{PREVCOMP}_n$ is next initialized to a value of zero (block 236), the purpose of which will be explained below.

The selected head 120 is moved to the selected track 152, block 238, after which a series of measurements are made of the position error signal (PES) and the current (I) applied to the coil 113, block 240. More particularly, as the head 120 follows the track 152, the head 120 will read each of the 76 servo fields 154 on the track 152. The servo circuit 148 generates a corresponding PES sample from the position information of each of the position fields 170, the PES sample indicative of the position of the head 120 relative to the center of the track 152. In response to the indicated position, the servo circuit 148 applies current to the coil 113 to maintain the head 120 nominally over the center of the track 152 (or otherwise in a fixed relationship with the track 152). Thus, the routine measures and temporarily stores 76 PES samples and 76 current measurement samples for the selected track. The operation of block 240 is preferably performed over a plurality of revolutions (for example, five) and the results are averaged for each of the servo fields 154.

Once the PES and current measurement samples have been obtained, any radial offset (also referred to as direct current, or DC component) present in the current measurements is removed by block 242. This is accomplished by summing the current measurements and dividing by the number of measurements (i.e., 76) to obtain an average value. This average value nominally represents the current required to maintain the head 120 at a fixed radius on the disc 106. As will be recognized, this value will typically be nonzero because current is usually required to maintain the head 120 in a fixed position in view of bias forces acting on the head 120 which tend to push the head 120 toward the inner or outer diameter of the disc 106; such bias forces usually arise from spring forces from the flex circuit assembly 124 and windage forces from the air currents established by the rotation of the discs 106.

Once the average value is obtained, it is subtracted from each of the current measurements obtained by block 240 to remove the DC component. In other words, the operation of block 242 results in the normalization (to zero) of the current measurements.

Once the DC component is removed from the current measurements, the routine of FIG. 7 passes to block 244, wherein a first integral of current (denoted generally as $\int I$) for each of the current measurements is obtained as follows:

$$\int I_1 = I_1 \tag{4}$$

$$\int I_2 = I_1 + I_2 \tag{5}$$

$$\ldots$$

$$\int I_{76} = I_1 + I_2 + \ldots + I_{76} \tag{6}$$

where $I_1$ is the first current measurement, $I_2$ is the second current measurement and so on, up to $I_{76}$ which is the last current measurement for the selected track.

Once the first integral of current is obtained by block 244, the DC component (if any) in the first integral of current is removed by block 246, as performed by block 242 discussed above. Once the DC component is removed, a second integral of current (generally denoted as $\iint I$) is determined as follows:

$$\iint I_1 = \int I_1 \tag{7}$$

$$\iint I_2 = \int I_1 + \int I_2 \tag{8}$$

$$\ldots$$

$$\iint I_{76} = \int I_1 + \int I_2 + \ldots + \int I_{76} \tag{9}$$

by the operation of block 248. Once the second integral of current is obtained, the routine passes to block 250 where, for each of the samples (=1 to 76) a MEAS value, indicative of the RRO, is obtained as follows:

$$MEAS_n = PES_n - \frac{1}{K_I} \int\int I_n \quad (10)$$

where $PES_n$ is the PES sample, $\int\int I_n$ is the second integral of current for sample n, and $K_I$ is a selected gain value. It will be recognized that equation (10) is similar in form to equation (3) discussed above. Once the MEAS values are obtained, the compensation values (COMP) are determined from the following relationship:

$$COMP_n = PREVCOMP_n + \frac{MEAS_n}{K_m} \quad (11)$$

where $PREVCOMP_n$ signifies a previous compensation value for each sample n (and was initially set equal to zero by the operation of block 236), $MEAS_n$ is the value obtained by equation (10) and $K_m$ is a gain value. A total of 76 compensation values will hence be obtained by the operation of block 250 and these compensation values are temporarily stored in a compensation table (such as that discussed above at 212 of FIG. 6) by block 252.

Because the routine of FIG. 7 iterates to a final solution for the compensation values, the PRECOMP values are updated at block 254 using the COMP values obtained by block 250. The routine next determines whether additional iterations should be performed, decision block 256. The criteria used by decision block 256 can be based on a selected number of iterations (such as five) or can be based on an evaluation of the RRO remaining in the PES (such as through the use of an appropriate threshold for the current applied to the coil 113 to maintain the head 120 on a substantially circular path along the selected track 152). When additional iterations are to be performed, the flow passes from decision block 256 back to block 240, where a new set of PES and current measurement samples are obtained, with the compensation values determined by block 250 first being added to the PES values as generally shown in FIG. 6.

At such time that the compensation values for the first head-track combination have been obtained, the routine passes from decision block 256 to block 258 wherein the compensation values are written to the COMP fields 160 of the servo fields 154 on the selected track 152, as shown by block 258.

The routine of FIG. 7 next determines whether additional tracks remain for the selected head, decision block 260. If so, the routine passes from decision block 260 to block 262 wherein the next track is selected (preferably the next adjacent track on the disc surface associated with the selected head), the PREVCOMPn value is initialized to zero (block 264) and the routine returns back to block 238. In this manner, compensation values are obtained and written to each of the tracks on the first disc surface.

The routine then moves to each successive head (decision block 266, block 268) and returns through the flow as shown until compensation values have been optimized and written to the associated COMP fields 160 for every servo field 154 on every disc 106, after which the routine ends at block 270.

Having concluded a discussion of the manner in which the compensation values are determined, the manner in which the compensation values are used will now be discussed. Turning to FIG. 8, shown therein is a generalized control diagram for the servo circuit 148. As will be recognized, portions of the control diagram of FIG. 8 can be advantageously implemented in programming utilized by the DSP of the control circuit 148.

As shown in FIG. 8, the head/disc assembly (plant) 200 receives a current command signal ("Icmd") on signal path 282 to position a selected head adjacent a selected track of the plant 200. In response to the position information from the servo fields 154 on the track, the plant 200 generates and outputs raw PES samples on signal path 284.

An observer 286, or plant model, is provided to model the input/output response characteristics of the plant 200. As will be recognized, the observer 286 generates a position estimate ("Xest"), a velocity estimate ("Vest") and a bias estimate ("Best") on signal paths 288, 290 and 292, respectively, which correspond to estimates of head position, head velocity and bias force. The bias force estimate takes into account spring forces exerted upon the actuator as a result of the flexure assembly (such as 124 of FIG. 1), windage forces upon the heads, and the like.

Additionally, a reference generator 294 provides position reference ("Xref"), velocity reference ("Vref") and current reference ("Iref") signals indicative of the desired position, velocity and current settings for the plant 200. These signals are output on paths 296, 298 and 300, respectively and have values which generally depend upon the particular operational mode of the servo circuit 148, such as track following or seeking. As will be recognized, the current reference Iref is typically provided with a value of zero during track following.

A summing junction 302 determines a position error ("Xerr") as the difference between the position reference Xref and the position estimate Xest, as shown. Similarly, a summing junction 304 determines a velocity error ("Verr") as the difference between the velocity reference Vref and the velocity estimate Vest, as shown. The position error Xerr is provided to a gain block 306 having a scalar gain of Kx and the velocity error Verr is provided to a gain block 308 having a scalar gain of Kv, so that the output quantities are summed by a summing junction 310 (along with the current reference Iref).

The output of the summing junction 310 is further summed with the bias estimate Best at a summing junction 312, as shown. The output of the summing junction 232 is provided on signal path 314 as a control input to the observer 286 and is indicative of the amount of current to be applied to the plant 200. However, to account for nominal variations in the operation of the plant 200, the output of the summing junction 312 is also provided to a gain block 316 having a gain Kp, so that the output thereof comprises the current command Icmd signal on path 282. As will be recognized, the gain Kp can be adjusted in a conventional manner to ensure the observer 286 accurately models the plant 200.

Significantly, the raw PES samples from the plant on path 284 are provided to a summing junction 318, which sums the compensation values read from the COMP fields 160 of the servo fields 154 on the track 152 (represented by block 320) to provide a compensated PES on path 322. As provided above, the compensation values operate to remove the RRO from the raw PES so that the compensated PES indicates true head position with respect to disc radius. The compensated PES is summed with the position estimate Xest by a summing junction 324 to generate an observer error ("Oerr") signal as an input to the observer 286 on path 326.

Accordingly, the servo circuit 148 operates to generate estimates of head position, velocity and bias force at a multi-rate of the PES sample rate, the estimates used to enable the servo circuit 148 to make head position corrections at times when the head is over the user data portions 156 (FIG. 4). Moreover, the compensation values enable the observer to use PES samples that more closely reflect true indicate head position, substantially removing the effects of RRO from the operation of the servo circuit 148.

It is therefore contemplated that the disc drive 100 will have the compensation values determined during the manufacturing of the disc drive 100 as set forth by the routine of FIG. 7, and will use the compensation values during servo operation as set forth by the circuit of FIG. 8. Although the foregoing embodiment stores the compensation values in the servo fields 152, it is contemplated that the compensation values could also be stored in memory, such as the DRAM 134 or flash memory 136, provided sufficient storage capacity exists to accommodate the relatively large number of compensation values.

In summary, it will now be clearly understood that the present invention is directed to an apparatus and method for compensating for repeated servo runout error in a disc drive (such as 100).

The disc drive includes a disc (such as 106) on which servo information is arranged as a plurality of servo fields (such as 154) which define tracks (such as 152) on the disc. An actuator assembly (such as 110) is provided adjacent the disc and includes a head (such as 120) which accesses the servo fields and an actuator motor (such as 114) which moves the head relative to the disc.

A servo circuit (such as 148) controls radial location of the head by applying current to the actuator motor in response to the servo information. The repeated servo runout error, caused by errors in the radial location of the servo fields on the disc, is compensated by the servo circuit through the use of compensation values (such as represented at 320) which are stored (such as by 258) in compensation fields (such as 160) of the servo fields. The compensation values are determined by measuring current applied to the actuator motor as the head follows a selected track (such as at 240), twice integrating the sequence of current measurement samples (such as performed at 244, 248) to determine a second integral of current, and using the second integral of current to determine the compensation values (such as at 250).

For the purposes of the appended claims, it will be understood that the term "circuit" will be broadly understood to cover both hardware and software implementations. Moreover, it will be understood that various claim steps have been identified using numbering and lettering solely as an aid in readability and understanding, so that such identification will not limit the claims to the particular ordering of the steps shown.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive of the type having a rotatable disc, a controllably positionable head adjacent the disc and a servo circuit for controlling the position of the head with respect to the disc in response to servo information stored in servo fields on tracks of the disc, a method for compensating for errors in the radial locations of the servo fields, comprising steps of:

(a) measuring current applied to a coil used to control the position of the head as the head follows a selected track, the measured current comprising a sequence of current measurement samples corresponding to the servo fields on the selected track;

(b) twice integrating the sequence of current measurement samples to determine a second integral of current; and (c) using the second integral of current to determine compensation values which, when added to position error signal samples subsequently obtained from the selected track, remove the effects of the errors in the locations of the servo fields on the selected track.

2. The method of claim 1, further comprising a step of:

(d) writing the compensation values to compensation fields of the servo fields on the selected track so that the compensation values are retrieved as the servo information in the servo fields is retrieved.

3. The method of claim 1, wherein step (b) further comprises steps of: p1 (i) integrating the sequence of current measurement samples by, for each selected sample, adding thereto each of the previous samples in the sequence to form a first integral of current comprising a sequence of first integrated current samples; and (ii) integrating the first integral of current by, for each first integrated current sample, adding thereto each of the previous integrated current samples in the sequence to form the second integral of current.

4. The method of claim 3, wherein step (b) further comprises a step of:

(iii) removing radial offset from the sequence of first integrated current samples and the sequence of second integrated current samples.

5. The method of claim 4, wherein step (b) further comprises a step of:

(iv) removing radial offset from the sequence of first integrated current samples.

6. In a disc drive of the type having a rotatable disc on which servo information is stored in the form of a plurality of servo fields which define tracks on the disc, a head which reads the servo information and a servo circuit which controls the position of the head through the application of current to a coil operably coupled to the head in response to the servo information, a method for compensating for random, repeated runout errors in the locations of the servo fields on the disc, comprising steps of:

(a) generating a sequence of position error signal samples from the servo fields on a selected track indicative of position of the head with respect to the servo fields;

(b) obtaining a sequence of current measurement samples indicative of the current applied to the coil in response to each position error signal sample;

(c) integrating the current measurement samples to obtain a first integral of current;

(d) integrating the first integral of current to obtain a second integral of current;

(e) using the second integral of current and the position error signal samples to generate a sequence of compensation values; and thereafter, (f) generating compensated position error signal samples by adding the compensation values to subsequently obtained position error signal samples to remove the random, repeated runout errors in the locations of the servo fields on the selected track.

7. The method of claim 6, further comprising a step of:

(g) writing the compensation values to compensation fields of the servo fields on the selected track so that the compensation values are retrieved as the servo information in the servo fields is retrieved.

8. The method of claim 6, further comprising a step of:
(g) removing radial offset from the sequence of current measurement samples.

9. The method of claim 6, further comprising a step of:
(g) removing radial offset from the first integral of current.

10. The disc drive of claim 9, wherein the servo circuit further removes radial offset from the sequence of current measurement samples.

11. The disc drive of claim 9, wherein the servo circuit further removes radial offset from the sequence of first integrated current samples.

12. A disc drive, comprising:
a disc having servo information arranged as a plurality of servo fields which define tracks on the disc;
an actuator assembly mounted adjacent the disc having a head which accesses the servo fields and an actuator motor which moves the head relative to the disc; and
a servo circuit, operably coupled to the actuator assembly and the actuator motor, which controls radial location of the head by applying current to the actuator motor in response to the servo information, the servo circuit minimizing effects of errors in radial location of the servo fields on the disc by:
measuring current applied to the actuator motor as the head follows a selected track, the measured current comprising a sequence of current measurement samples corresponding to the servo fields on the selected track;
twice integrating the sequence of current measurement samples to determine a second integral of current; and
using the second integral of current to determine compensation values which, when added to position error signal samples subsequently obtained from the selected track, remove the effects of the errors in the radial locations of the servo fields on the selected track.

13. The disc drive of claim 12, wherein the servo fields comprise compensation fields, and wherein the head writes the compensation values to the compensation fields for subsequent use by the servo circuit when the head is caused to follow the selected track.

* * * * *